United States Patent
Abou-Jaoude et al.

(10) Patent No.: US 6,700,531 B2
(45) Date of Patent: Mar. 2, 2004

(54) INTEGRATED MULTIPLE-UP/DOWN CONVERSION RADAR TEST SYSTEM

(75) Inventors: Ramzi Abou-Jaoude, Santa Clara, CA (US); Donald Bradley, Morgan Hill, CA (US); Karam Noujeim, Sunnyvale, CA (US); David Geller, San Jose, CA (US); Martin I. Grace, San Jose, CA (US)

(73) Assignee: Anritsu Company, Morgan Hill, CA (US)

( * ) Notice: Subject to any disclaimer, the term of this patent is extended or adjusted under 35 U.S.C. 154(b) by 0 days.

(21) Appl. No.: 10/198,451

(22) Filed: Jul. 17, 2002

(65) Prior Publication Data

US 2004/0012517 A1 Jan. 22, 2004

(51) Int. Cl.$^7$ ............................................... H01S 7/40
(52) U.S. Cl. ................................................... 342/165
(58) Field of Search ............................. 342/165, 169, 342/170, 171, 172

(56) References Cited

U.S. PATENT DOCUMENTS 5,384,572 A * 1/1995 Michaels et al. ............ 342/172
5,457,463 A * 10/1995 Vencel et al. ............... 342/169
5,920,281 A    7/1999 Grace .......................... 342/165
6,087,995 A    7/2000 Grace et al. ................. 343/703
6,384,772 B1   5/2002 Bradley ....................... 342/172

* cited by examiner

Primary Examiner—Daniel T. Pihulic
(74) Attorney, Agent, or Firm—Fliesler Meyer LLP

(57) ABSTRACT

An automotive radar test system includes circuitry for multiple down and up conversions of a signal from the automotive radar. Conditioning circuitry delays an intermediate frequency signal ($IF_2$) obtained after a second down conversion to simulate the delay of a return signal from an object located a particular distance from the automotive radar, and to attenuate the $IF_2$ signal to simulate variable target sizes, and to generate a Doppler shift in the $IF_2$ signal to simulate target speed. The conditioned signal is up-converted and transmitted back to the automotive radar system to determine if the automotive radar provides accurate readings for distance, size and speed. The radar test system further couples the second IF signal to a spectrum analyzer to determine if the automotive radar is operating in the desired bandwidth and to a power meter to determine if the automotive radar is transmitting at a desired power level.

25 Claims, 3 Drawing Sheets

INTEGRATED MULTIPLE-UP/DOWN CONVERSION RADAR TEST SYSTEM

BACKGROUND OF THE INVENTION

1. Field of the Invention

The present invention relates to a device for testing the performance accuracy of an automotive radar system. More particularly, the present invention relates to a downconversion of the automotive radar system signals in a radar target simulator in a manner to enable improved performance and lower cost radar components and assemblies.

2. Background

Automobile manufacturers have begun producing automotive radar systems. An automotive radar transmits a signal from an antenna typically located in the grill area of an automobile. The automotive radar then determines, from the delay of a return signal received by the antenna, the distance an object causing there turn signal. The automotive radar can also determine, from the Doppler frequency shift of the return signal, the speed an object causing the return signal is traveling. The automotive radar system can also determine the size of an object causing the return signal through the radar cross section (RCS). Automotive Radar Systems in the United States are configured to operate nominally within a 76–77 GHz frequency band allocated by the Federal Communications Commission (FCC) for automotive radar systems.

To assure proper performance of an automotive radar system, the device must be regularly tested. Testing is performed to assure the automotive radar system is operating within the required frequency range specified by the FCC. Testing is also performed to assure that the system is radiating adequate power. Test measurement is further made to assure that the automotive radar system is making proper calculations of distance to an object creating a return signal.

Test systems have been developed that utilize a single frequency conversion scheme to simulate moving targets, with a know radar cross section, at a prescribed distance. One such system is disclosed in U.S. Pat. No. 5,920,281 entitled "Radar Test System For Collision Avoidance Automotive Radar." The system receives a 76–77 GHz signal from the automotive radar system and down-converts the signal to a fixed intermediate frequency (IF) at which the signal is analyzed to determine operating power and frequency and conditioned to simulate a target. The conditioned signal is then up-converted and re-radiated, either from a separate antenna or from the same antenna. For signal analysis, the system provides at least two IF signal outputs, one for monitoring frequency using a spectrum analyzer and another for monitoring power.

A test system can be configured to provide a signal return from a target with a known RCS, at a prescribed distance and moving at a certain velocity as described in U.S. Pat. No. 6,087,995 entitled "Universal Auto radar Antenna Alignment System." For each target distance, the RCS level can be varied to simulate different target sizes. The delay is simulated using delay lines (coaxial or Bulk Acoustic) of various lengths, in parallel.

Simulated velocity is achieved by introducing false Doppler into the returned signal as further described in U.S. Pat. No. 6,087,995. False Doppler is achieved by offsetting the LO of the down-converter from that of the up-converter. One of the LO sources is a synthesizer referenced to a crystal resonator, while the other is a tunable synthesizer referenced to the crystal resonator. The two LO sources use the same crystal reference to ensure Doppler stability.

SUMMARY

In accordance with the present invention, a radar test system is provided for an automotive radar system, which provides multiple up-conversions and down-conversions. The multiple frequency conversion schemes provide for lower cost components and improved performance over previous radar test systems.

The radar test system in accordance with the present invention provides for conditioning an IF signal, lower in frequency than previous systems, to assure that an automotive radar system is simulating targets by providing variable parameters in the conditioned signal, including distance (using a SAW or coaxial device), and size (or RCS). Further variable speed (or Doppler shift) is provided at the first upconversion from the lower IF frequency rather than upconversion to the original RF frequency, enabling lower cost components to be used and more accuracy to be achieved. Testing to assure the automotive radar is operating within a desired frequency band can be performed by providing an external connection from the radar test system to a spectrum analyzer after the first downconversion. Similarly, power measurements can be provided using an external connection to a power meter after the first downconversion. A logarithmic detector is used after the first downconversion to detect the lower IF frequency, enabling the LO to be adjusted to assure the IF frequencies remain fixed.

BRIEF DESCRIPTION OF THE DRAWINGS

The present invention will be described with respect to particular embodiments thereof, and references will be made to the drawings in which.

DETAILED DESCRIPTION

Figure 1:
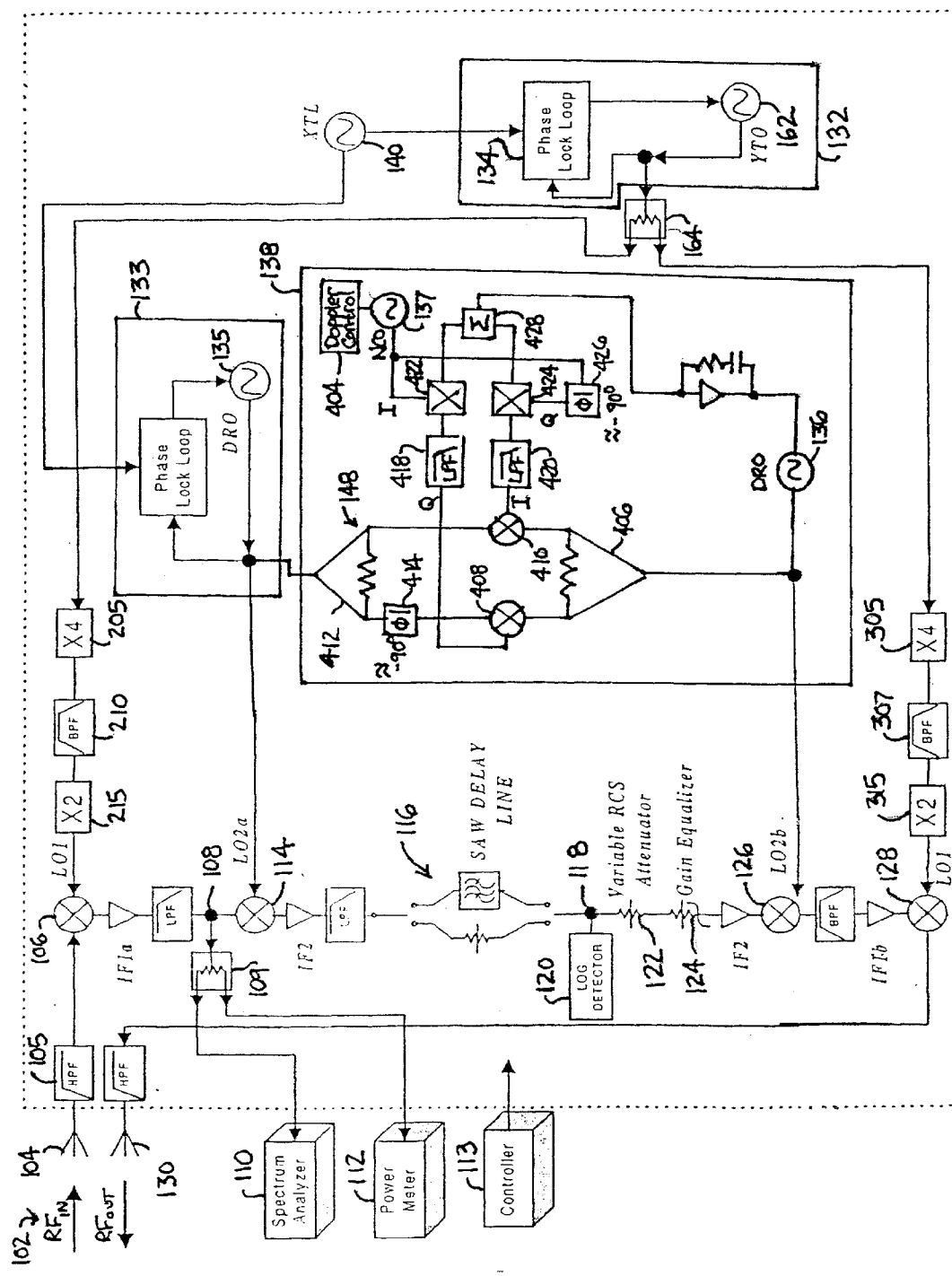
FIG. 1 shows the components of a radar test system in accordance with the present invention.

FIG. 1 shows components of the radar test system 100 in accordance with the present invention included which uses a double up-conversion as well as a double down-conversion. The radar test system receives a signal from the automotive radar system ($RF_{in}$) 102, which should be in the 76–77 GHz bandwidth, utilizing an antenna 104. The antenna 104 used can be a standard gain pyramidal horn. Absorbing material is preferably provided around antenna to minimize the reflections from the edges of the antenna and housing of the radar test system.

The received signal is coupled through a high pass filter 105 to a first down-converter 106, along with a local oscillator (LO) signal $LO_1$. The downconverter 106 down-converts the received signal to a first intermediate frequency signal ($IF_1$). Based on the detected power levels of the radar signal, as discussed in more detail subsequently, the frequency of the $LO_1$ signal is adjusted such that the signal $IF_1$ is at a fixed frequency.

The $IF_1$ signal is provided from a buffer amplifier and low pass filter to remove higher harmonics. The $IF_1$ signal may be coupled off from node 108 through a power divider 109 to a spectrum analyzer 110 and a power meter 112. The spectrum analyzer 110 may be utilized to determine if the automotive radar system is operating within prescribed bandwidth limits. The power meter 112 enables determination of the radiated power from the automotive radar system.

The signal $IF_1$ is next down-converted in a second down-converter 114 to a signal $IF_2$ using a second LO signal LO2a. The signal $IF_2$ is then passed through a buffer and low pass filter to remove higher frequency harmonics. The $IF_2$ signal is then delayed in time using delay device 116 to impose a desired group delay to simulate a particular distance. In the embodiment shown, the delay device 116 is a parallel combination of a Surface-Acoustic Wave (SAW) delay device and a coaxial cable. Switches connect one of either the SAW device or coaxial cable to provide the desired delay. The delay device 116 may alternatively comprise series connected delay modules as shown in FIG. 2.

Figure 2:
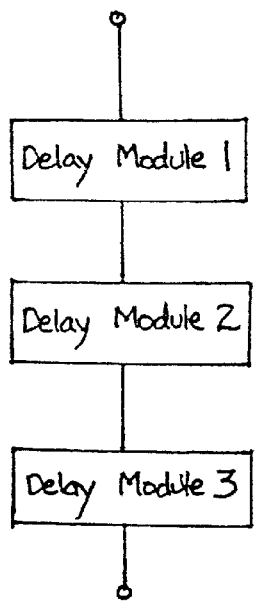
FIG. 2 illustrates delay modules connected in series, which maybe used in place of the parallel delay devices of FIG. 1.
Figure 3:
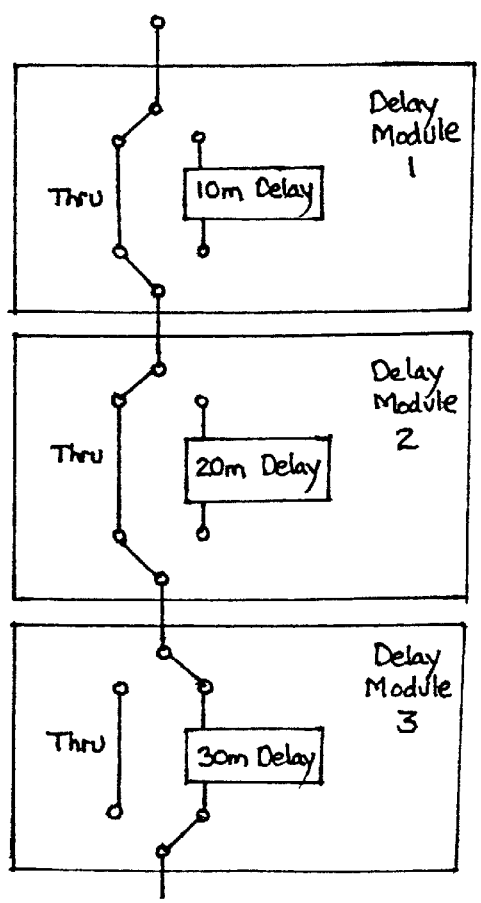
FIG. 3 illustrates how delay modules can also be made of a series of parallel-connected devices.

The delay modules of FIG. 2 can contain either SAW devices, or desired lengths of coaxial cable as desired. The delay modules can also contain a series of parallel connected devices as shown in FIG. 3. The switches in the delay modules can connect to a short through line to effectively provide minimal delay, or through either a SAW device or coaxial cable length to provide the delay shown. With the 10-meter, 20 meter and 30 meter delays shown, a stepped delay can be provided in steps of 10 m from 0–60 meters. Different delay lengths can be used to provide different steps, and a different number of modules can be used to provide a greater range or steps as desired.

The signal from the delay device 116 can be coupled at node 118 to a log detector 120. The log detector 120 provides a calibrated measure of the integrated power and enables the LO to be adjusted to assure $IF_1$ and $IF_2$ remain at their required fixed frequency. The $IF_2$ signal is then further attenuated using variable attenuator 122 to simulate a particular RCS level. From the attenuator, the $IF_2$ signal is provided through a gain equalizer 124. The gain equalizer 124 can include coaxial cavity-tuned equalizers to reduce amplitude variations over the frequency range of the signal received, as discussed in more detail subsequently.

The $IF_2$ signal is then buffered and provided to an up-converter 126 along with a LO signal LO2b, the upconverter 126 converting the $IF_2$ signal to an $IF_1$ signal. The $IF_1$ signal is then provided through a band pass filter and buffer amplifier to remove harmonics and intermnodulation products created by the first upconverstion, and provided to a second upconverter 128 along with an LO signal LO2b. The signal LO2b is equal to the signal LO2a plus a Doppler shift. The second upconverter 128 converts the $IF_1$ signal back to the original 76–77 GHz band plus any Doppler shift to provide the signal RFout. The signal from the second upconverter 128 is re-radiated through a second antenna 130 to the automotive radar system.

The LO signals, $LO_1$, LO2a and LO2b are provided from synthesizers 132, 133 and 137, all being referenced to a crystal reference oscillator 140. The crystal oscillator 140 drives the synthesizer 132 which includes a phase locked loop 134 in combination with a YIG Tuned Oscillator (YTO) 162. The output of the synthesizer 132 is provided through a power divider 164 which provides signals down two paths. One path is through a x4 multiplier 205, bandpass filter 210 and x2 multiplier 210 to mixer 106 to provide the $LO_1$ signal for downconversion. A second path is through the x4 multiplier 305, bandpass filter 307 and x2 multiplier 315 to provide the $LO_1$ signal to mixer 128 for upconversion.

The crystal reference oscillator 140 also drives synthesizer 133. The synthesizer 133 includes a phase locked loop 166 in combination with a dielectric resonator oscillator (DRO) 135. The output of synthesizer 137 provides the LO2a signal for downconversion to mixer 114.

The local oscillator signals LO2a and LO2b are from separate oscillator sources that track each other to ensure frequency stability. To enable tracking, the output of the synthesizer 133 provides the signal LO2a as well as the input of an I-Q mixer 148. The I-Q mixer 148 includes components to compare the frequency from each source and a phase locking scheme to offset the LO2a oscillator 135 from the DRO oscillator 136 used to generate the LO2b signal. The offset frequency constitutes a Doppler shift (or simulated target speed) for the simulated radar target. This technique of generating the false Doppler, described in more detail subsequently, allows suppression of the carrier and sidebands to levels better than 50 dBc.

More details of the radar test system in accordance with the present invention are described in sections to follow.

I. Millimeter Wave Up/Down Converter Modules

Figure 4:
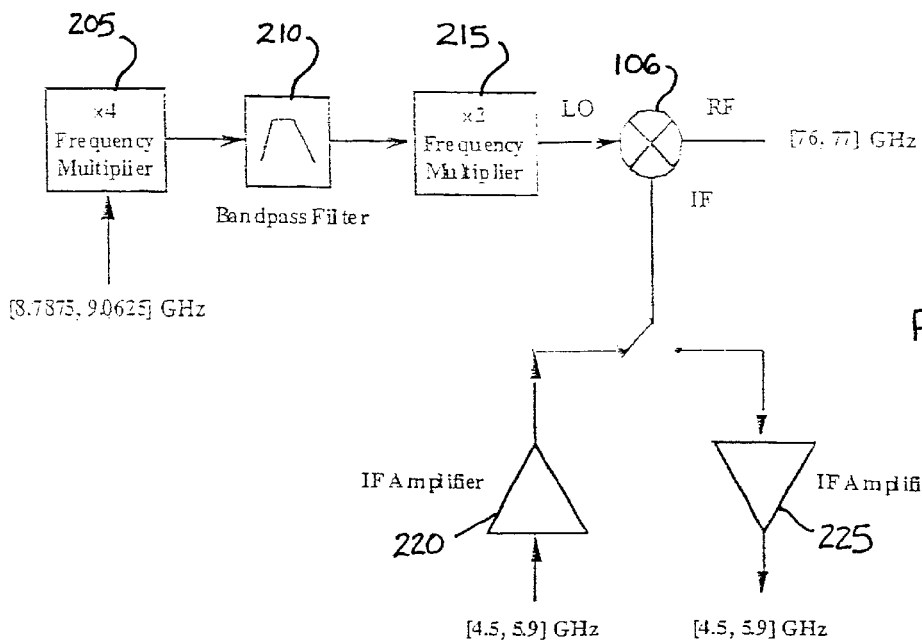
FIG. 4 shows the components of a millimeter-wave frequency-conversion module which may be used to provide components for the circuit of FIG. 1.

The radar test system, in one embodiment, uses a millimeter-wave frequency-conversion module as shown in FIG. 4. The components of the module of FIG. 4 can be used for the components 205, 210, 215 and 106 of FIG. 1, and are similarly labeled. The components of FIG. 4 can, likewise, be used for the components 305, 310, 315 and 128 of FIG. 1. The millimeter-wave module can be configured for use as a frequency up-converter or down-converter by switching between two IF amplifiers 220 and 225 with opposite gain direction, or by physically rotating the IF amplifier during manufacture.

MMICs operating outside of their manufacturer's frequency ranges can still be used for frequency multiplication and mixing. This provides a low-cost alternative at the expense of deterioration in the mixer-conversion loss. Mixer-conversion loss is improved by making use of one of the IF amplifiers 220 or 225. The dependence of the mixer conversion-loss on the LO frequency can be eliminated by using a waveguide diplexer at the input port of the module, which provides LO leakage signals with a path to a matched resistive load.

I. Double Conversion Scheme Effects

The multiple conversion scheme used in the system of FIG. 1 enables a lower system cost and improved performance. The following sections describe the benefit of the multiple conversion scheme.

A. Doppler Shift

The radar test system performs Doppler simulation using a scheme of phase locking the two oscillators 135 and 136 of FIG. 1 with an offset as disclosed in U.S. Pat. No. 6,384,772, which is incorporated herein by reference. The components of the phase locking scheme include a power splitter 406 for distributing the signal from oscillator 136 to the first input of mixers 408 and 410. A power splitter 412 distributes the signal from oscillator 135 to the second input of mixer 410 and to the second input of mixer 408 with a phase shift φ1 in phase shifter 414 to generate first I and Q signals from mixers 408 and 410. Higher frequency components of the first I and Q signals are filtered out by low pass filters 418 and 420 and the signals are applied to first inputs of multipliers 422 and 424.

A numerically controlled oscillator 137 receives a numerical control signal from Doppler control unit 404 to provide a Doppler offset which may be from 0 to 50 KHz, or another frequency range depending on design requirements. The output of the oscillator 137 is provided directly to multiplier 422 to provide a second I signal for multiplying by the first Q signal. The output of oscillator 137 is further provided to multiplier 424 through a phase shifter 426 to multiply a second Q signal by the first I signal. The phase shifter 426 provides a phase shift $\phi 1$ either matching the phase shift of phase detector 414, or with an additional 180 degrees from the phase shift $\phi 1$. The output of multiplier 422 is subtracted from the output of multiplier 424 in summer 428. The output of summer 428 then provides a voltage control signal to DRO 136.

As configured, the phase locking circuitry creates a phase detector, so that the output of the summer 428 provides a DC signal $\sin(\phi 2)$, where $\phi 2$ is a phase difference between the signals combined from oscillators 135 and 136. The circuitry enables stable tracking of a minimal frequency offset such as from 0–50 KHz with the oscillators operating in the range of 10 GHz.

The double-conversion system utilized in the radar test system improves on prior Doppler schemes by allowing the two oscillators 135 and 136 to be at a lower frequency than a single conversion system would allow. This reduces the cost of the oscillators 136 and 137 and the I-Q mixer 148. The double-conversion also allows the oscillators 135 and 136, which provide the LO2 signals, to act as fundamental local oscillators to mixers 114 and 126, thus eliminating the need for additional frequency multipliers. This allows the oscillators 135 and 136 to have lower phase noise requirements and a lower cost. The double-conversion scheme also improves system performance because it reduces the effect on the system of the spurious sidebands generated by the I-Q mixer 148. These sidebands would have a bigger effect on the system if the local oscillator had to be multiplied up in frequency. This technique of generating the Doppler shift may allow suppression of the spurious sidebands to levels better than 50 dBc.

Although the oscillators 135 and 136 are shown phase-locked to a common reference 140, they may alternatively be free-running. Although accuracy of the free running components will not be as high, component costs are still reduced from a single conversion scheme because of the reduced cost of low frequency components.

B. Delay Lines

The radar test system may simulate target distance by providing a group delay to the signal. The double-conversion scheme allows the radar test system to utilize a Surface Acoustic Wave (SAW) 116 filter as a delay line. The radar test system may be designed to use a single SAW device 116 or multiple SAW devices, in series or in parallel, as described previously, to achieve either a single delay or multiple delays, respectively. As compared to a Bulk Acoustic Wave or a coaxial delay line, a low frequency SAW delay line reduces system costs and allows the delay line to be mounted directly onto a surface mount board with other surface mount components.

In one embodiment, the radar test system also suppresses the leakage around the SAW delayline to at least 50 dB below the delayed signal. This maybe accomplished by mounting the SAW device on a surface-mount board with a ground plane printed on the board surrounding the SAW, with the exception of the input and output traces. The board with the SAW device is placed in a metallic housing, or metal can. Thin metallic walls of the can are mounted such that contact is made with the top metallic lid of the SAW device, to the ground plane on the board around the SAW device, to the walls to the side of the SAW device, and to the lid of the radar test system module housing. In an alternative embodiment, the SAW can be mounted upside down in a metal cavity in the radar test system housing.

C. RCS Control

The radar test system uses a low-frequency attenuator 122 to attenuate the radar signal to simulate different target sizes or RCS. Use of the double-conversion scheme enables the use of a low-frequency attenuator, which reduces cost. The attenuator may be surface mounted and integrated into the same module as the SAW delay device.

D. Gain Equalizer

Figure 5:
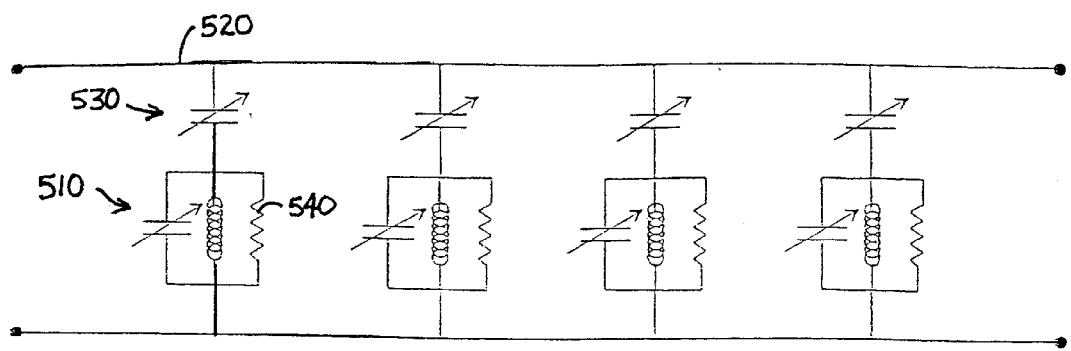
FIG. 5 shows the components of a gain equalizer, which maybe used in the circuit of FIG. 1.

The radar test system uses a low-frequency gain equalizer 124, which is enabled by using the double-conversion scheme. FIG. 5 shows a diagram of one embodiment of the gain equalizer 124. The gain equalizer includes a cascade of tuned resonant circuits 510 that are coupled to the main transmission line 520. The coupling factor and resonant frequency of each resonator is tuned by varying the surface mount capacitors 530. The equalizer includes one or more of the tuning sections 510, where each section varies the amplitude over a specific frequency band. Resistors, such as 540, are used to control the width of each resonant section.

E. Signal Power Measurement

A low-frequency RF detector 120 is placed after the SAW delay line 116. The SAW delay 116 acts as a bandwidth-limiting RF filter. Using the SAW device as such a filter allows the RF detector 120 to accurately measure the integrated power of the radar signal without the use of an external power meter, thus reducing the overall system cost.

F. LO Tuning

The signal from the automotive radar system can occupy a frequency bandwidth referred to as BWn, such as 300 MHz, within the allocated bandwidth of 76–77 GHz, referred to as BWw. To detect the signal from the automotive radar system, the radar test system must operate over the wider bandwidth of BWw, since the radar signal frequency from the automotive radar will be unknown and can be located anywhere in the band BWw. Therefore, the radar test system intermediate frequencies $IF_1$ and $IF_2$ must also occupy the wider bandwidth of BWw.

In order to use a low-cost SAW delay line with the narrow frequency bandwidth of BWn, the radar test system of the present invention uses a special LO tuning scheme. A single tunable synthesizer 132 provides the LO and LO1 for both of the IF mixers 106 and 128. The output of oscillator 162 can be multiplied up if necessary, as it is in FIG. 1 using multipliers such as 205, 215, 305 and 315. In order to detect the presence of a radar signal at an RF frequency in the 76–77 GHz band (BWw), the oscillator 162 is swept over a bandwidth of at least BWw. The radar signal from the automotive radar, RF, is down-converted using mixer 106 to a frequency of $IF_{1(tune)}=RF-LO_{1(tune)}$, which is then down-converted using mixer 114 to $IF_{2(tune)}$. As the oscillator is tuned in frequency using controller 113, the RF detector 120 is used to monitor the power of the signal passing through the SAW device 116. The controller 113 uses measurements from the RF detector 120 to tune the LO so that $IF_{2(tune)}=IF_2$, $IF_2$ being the center frequency of the SAW device where the RF detector will have a maximum power reading. The radar test system can use this maximum power reading to establish the actual frequency of the radar signal, RF, in the band BWw. Once the frequency RF is established, the oscillator frequency $LO_1$ may be set to the tuned frequency to enable the radar test system to perform the target simulation function. Continued monitoring of the $IF_1$ signal by controller 113 and the phased locked loops 160 and 166 adjusts the $LO_1$ frequency to assure $IF_1$ remains fixed.

The tunable oscillator 162 may be free running or phase-locked. If the oscillator 162 is phase-locked to an internal or external reference, such as crystal reference 140, then the frequency of the tuned oscillator 162 is known accurately and can be used to determine the frequency of the radar signal accurately. This feature allows the radar test system to determine and display to the user the frequency of the radar without the use of an external spectrum analyzer, thus reducing the overall system cost.

Although the present invention has been described above with particularity, this was merely to teach one of ordinary skill in the art how to make and use the invention. Many other modifications will fall within the scope of the invention, as that scope is defined by the claims provided to follow.

What is claimed is:

1. A method for testing an automotive radar system, comprising:
   receiving a signal from the automotive radar system;
   down-converting frequency of the signal from the automotive radar system to provide a first intermediate frequency signal;
   down-converting frequency of the first intermediate frequency signal to provide a second intermediate frequency signal;
   delaying the second intermediate frequency signal;
   up-converting frequency of the second intermediate signal to provide a conditioned signal; and
   transmitting the conditioned signal to the automotive radar system.

2. The method of claim 1 further comprising the step of attenuating the second intermediate frequency signal.

3. The method of claim 1 further comprising the steps of:
   detecting a power level of the second intermediate frequency signal; and
   using the power level to control the step of down-converting a signal from the automotive radar system so that the first intermediate frequency signal has a substantially fixed frequency range.

4. The method of claim 1, wherein the step of upconverting comprises the steps of:
   up-converting the frequency of the second intermediate signal to a third intermediate signal; and
   up-converting the third intermediate signal to provide the conditioned signal.

5. The method of claim 4 further comprising the step of generating a Doppler shift in the signal during the step of upconverting the frequency of the second intermediate signal.

6. The method of claim 1, further comprising the step of coupling off the first intermediate frequency signal to a spectrum analyzer.

7. The method of claim 1 further comprising the step of coupling off the first intermediate frequency signal to a power meter.

8. A method for testing an automotive radar system, comprising:
   receiving a signal from the automotive radar system;
   down-converting frequency of the signal from the automotive radar system a given number of times, the given number being an integer greater than two, to provide an intermediate frequency signal;
   delaying the intermediate frequency signal;
   up-converting frequency of the intermediate signal the given number of times to provide a conditioned signal; and
   transmitting the conditioned signal to the automotive radar system.

9. The method of claim 8 further comprising the step of attenuating the intermediate frequency signal.

10. The method of claim 8 further comprising the steps of:
    detecting a power level of the intermediate frequency signal; and
    using the power level to control the step of down-converting so that the intermediate frequency signal has a substantially fixed frequency range.

11. The method of claim 8 further comprising the step of generating a Doppler shift in the signal during the step of up converting the frequency of the intermediate signal.

12. An apparatus for testing an automotive radar system, comprising:
    an antenna to receive a signal from the automotive radar system;
    a first down-converter having a first input coupled to said antenna, a second input and an output;
    a second down-converter having an input coupled to the output of the first down-converter, a second input and an output;
    a first up-converter having an input coupled to the output of the second down-converter, a second input and an output;
    a second up-converter having an output coupled to transmit a signal to the automotive radar system, a first input coupled to the output of second down-converter and a second input;
    a first local oscillator for providing a first LO signal to the second input of the first up-converter and second down-converter;
    a second local oscillator for providing a second LO signal to the second input of the second down-converter; and
    a third local oscillator for providing a third LO signal to the second input of the first up-converter.

13. The apparatus of claim 12 further comprising a delay mechanism having an input coupled to the output of the second down-converter and an output coupled to the first up-converter.

14. The apparatus of claim 13, wherein said delay mechanism comprises a Surface Acoustic Wave (SAW) delay line.

15. The apparatus of claim 13, wherein the delay mechanism comprises:
    a first switch having a common terminal forming the input of the delay mechanism, a first switching terminal and a second switching terminal;
    a second switch having a common terminal forming the output of the delay mechanism, a first switching terminal and a second switching terminal;
    a Surface Acoustic Wave (SAW) delay line connected between the first switching terminals of the first and second switches; and
    a through line having connected between the first switching terminals of the first and second switches.

16. The apparatus of claim 13, wherein the delay mechanism comprises a group of series connected modules, each module comprising:

a first switch having a common terminal forming an input of the module, a first switching terminal and a second switching terminal;

a second switch having a common terminal forming the output of module, a first switching terminal and a second switching terminal;

a Surface Acoustic Wave (SAW) delay line connected between the first switching terminals of the first and second switches; and a through line having connected between the first switching terminals of the first and second switches.

17. The apparatus of claim 16, wherein a delay provided by the SAW device in each module is a multiple of a delay the SAW device in an adjacent module.

18. The apparatus of claim 13 further comprising a log detector coupled to the output of the delay mechanism.

19. The apparatus of claim 13 further comprising:

an attenuator having an input coupled to the output of the delay mechanism and an output; and a gain equalizer having an input coupled to the output of the attenuator.

20. The apparatus of claim 12 wherein further comprising:

a Doppler shift generator having an output coupled to provide an offset frequency between the second and third local oscillators.

21. The apparatus of claim 12 wherein further comprising:

a first mixer (408) having a first input coupled to an output of the second local oscillator (135), a second input coupled to an output of the third local oscillator (136), and having an output;

a first phase shifter (414) having an input coupled to the output of the second local oscillator (135), and having an output;

a second mixer (410) having a first input coupled to the output of the third local oscillator (136), a second input coupled to the output of the first phase shifter (414), and having an output;

a first filter (420) having an input coupled to the output of the second mixer (410), and having an output;

a second filter (418) having an input coupled to the output of the first mixer (408), and having an output;

a first multiplier (422) having a first input coupled to the output of the second filter (418), a second input coupled to an output of a reference oscillator (137), and having an output;

a second phase shifter (426) having a first input coupled to the output of the reference oscillator (137), and having an output;

a second multiplier (424) having a first input coupled to the output of the first filter (420), a second input coupled to the output of the second phase shifter (426), and having an output; and a subtractor (428) having a first input coupled to the output of the first multiplier (422), a second input coupled to the output of the second multiplier (424), and having an output coupled to a frequency control input of the third local oscillator (136).

22. The apparatus of claim 21, wherein the reference oscillator(137) comprises a numerically controlled oscillator (NCO), receiving a numerical control input from a Doppler offset controller (138).

23. The apparatus of claim 12, further comprising a power meter coupled to the output of the first down-converter.

24. The apparatus of claim 12, further comprising a spectrum analyzer coupled to the output of the first down-converter.

25. An apparatus for testing an automotive radar system, comprising:

an antenna to receive a signal from the automotive radar system;

a down-converter having a first input coupled to said antenna, a second input and an output;

a delay mechanism having an input coupled to the output of the down-converter and an output, the delay mechanism comprising series connected modules, each module comprising:

a first switch having a common terminal forming an input of the module, a first switching terminal and a second switching terminal;

a second switch having a common terminal forming the output of module, a first switching terminal and a second switching terminal;

an Surface Acoustic Wave (SAW) delay device connected between the first switching terminals of the first and second switches; and a through line having connected between the first switching terminals of the first and second switches; and an up-converter having an input coupled to the output of the delay mechanism and an output coupled to transmit a signal to the automotive radar system.

* * * * *